United States Patent [19]

Fujii

[11] Patent Number: 4,620,239
[45] Date of Patent: Oct. 28, 1986

[54] RETRIEVAL SIGNAL RECORDING APPARATUS FOR MAGNETIC TAPE RECORDING/REPRODUCING APPARATUS

[75] Inventor: Fumiaki Fujii, Katsuta, Japan
[73] Assignee: Hitachi, Ltd., Tokyo, Japan
[21] Appl. No.: 589,645
[22] Filed: Mar. 14, 1984

[30] Foreign Application Priority Data

Mar. 18, 1983 [JP] Japan ................................. 58-44118

[51] Int. Cl.⁴ ............................ G11B 5/00; G11B 5/02
[52] U.S. Cl. ......................................... 360/8; 360/27
[58] Field of Search ............................... 360/8, 27, 49

[56] References Cited

U.S. PATENT DOCUMENTS 3,315,242 4/1967 Haddad .................................. 360/8
3,584,158 6/1971 Jefferies et al. ......................... 360/8
3,681,524 8/1972 Nicholls ............................... 360/49

*Primary Examiner*—Vincent P. Canney
*Attorney, Agent, or Firm*—Antonelli, Terry & Wands

[57] ABSTRACT

A retrieval signal recording apparatus for magnetic recording/reproducing apparatus wherein when an information signal is recorded on a magnetic tape, a retrieval signal different from the information signal is recorded at the beginning of the recorded information signal so that the magnetic tape is stopped or made in the reproducing mode just when the retrieval signal is picked up from the tape under a high tape speed. In the retrieval signal recording apparatus, the retrieval signal is recorded for a certain time only at the beginning of recording the signal or at both the beginning and end of the recorded signal, and the recording time of the retrieval signal is changed in accordance with the switching of a plurality of tape speeds such that the length of the retrieval signal recorded on the magnetic tape is made substantially constant even if the tape speed is different.

18 Claims, 10 Drawing Figures

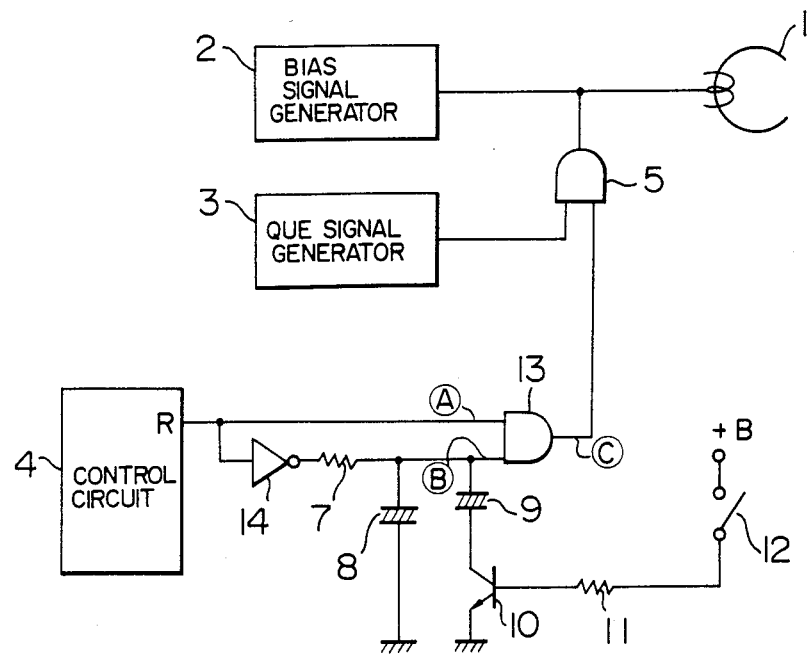
FIG. 1
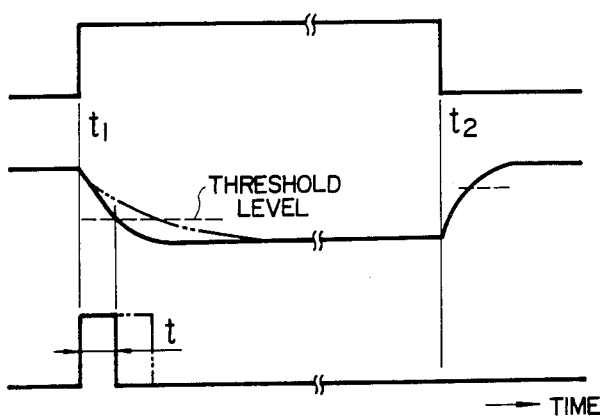
FIG. 2a
FIG. 2b
FIG. 2c

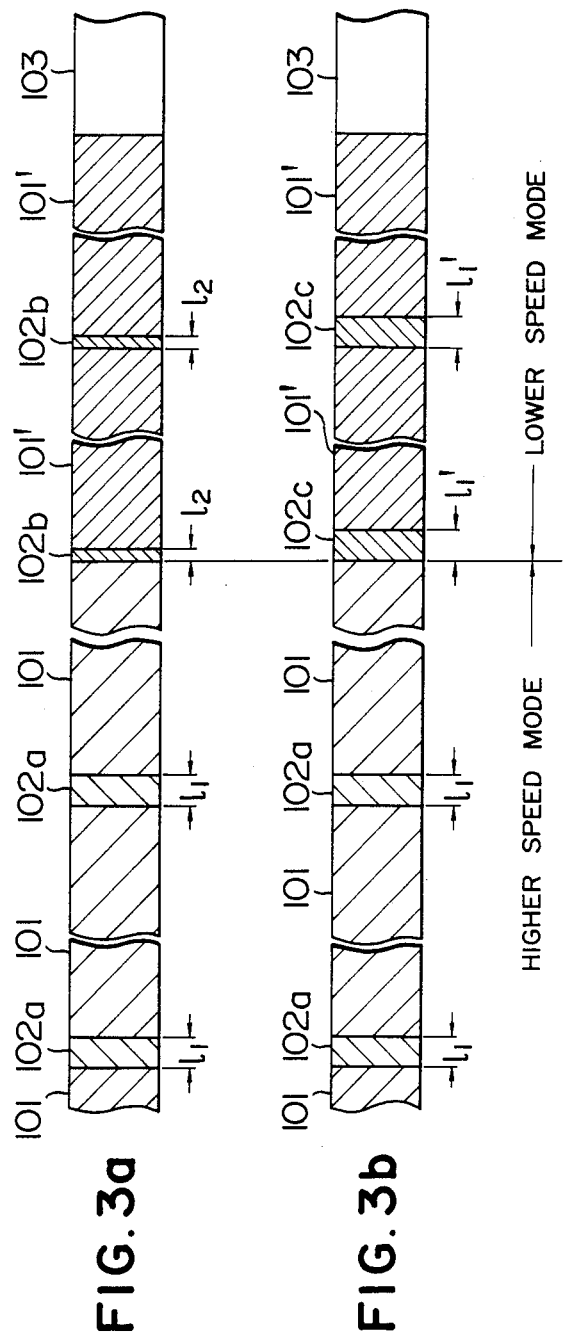

FIG. 4
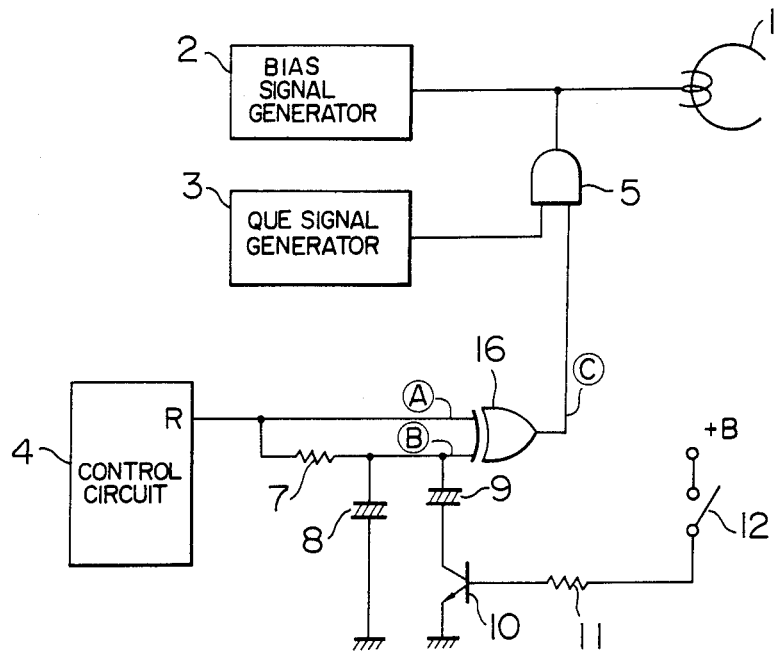
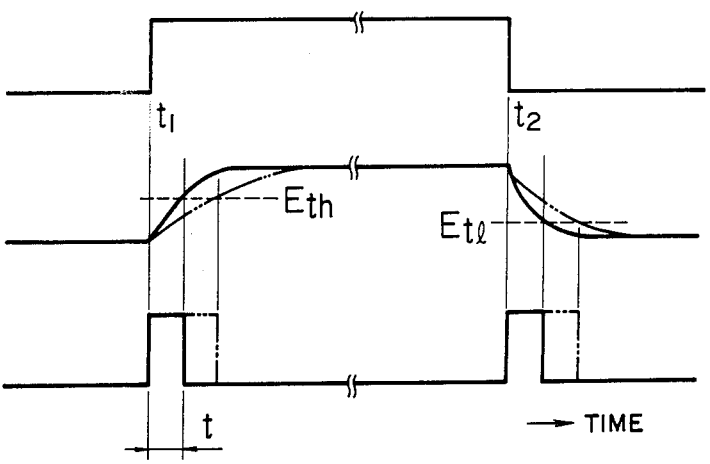
FIG. 5a
FIG. 5b
FIG. 5c

RETRIEVAL SIGNAL RECORDING APPARATUS FOR MAGNETIC TAPE RECORDING/REPRODUCING APPARATUS

This invention relates to a video or audio magnetic tape recording/reproducing apparatus, and particularly to an apparatus for recording a signal to be used for automatic retrieval operation by which the magnetic tape mounted on such a magnetic tape recording/reproducing apparatus is automatically stopped at a desired tape position.

The magnetic tape recording/reproducing apparatus is desired to have a function of the so-called automatic search operation in that the beginning of a desired information signal block is found on a magnetic tape which is moving at a high speed to stop the tape or move the tape at a normal speed for reproduction of the desired information signal portion.

In a known example of such magnetic tape recording/reproducing apparatus having this function, a cue signal of a constant duration is recorded at the beginning of each block of an information signal recorded, so that upon rewinding or fast-forwarding, the cue signal is detected to control the movement of the magnetic tape.

When the cue signal is recorded on special track of the magnetic tape, it is possible to freely decide the form of and recording time of the cue signal. However, in the home-use type magnetic recording/reproducing apparatus in which high-density recording is carried out over a narrow-width magnetic tape, it is almost impossible to provide an extra track for the cue signal. It will be possible that a signal having little influence on information signal and being distinguishable from the information signal, for example, a low-frequency signal of or below audio frequencies is recorded on the track of the information signal for a short time in a composition or superimposing manner. However, since even this low-frequency signal more or less affects the information signal upon reproduction, it is necessary to decrease the recording time of the cue signal to a minimum. In addition, in most of the home-use type magnetic tape recording/reproducing apparatus, a plurality of tape speeds can be freely selected by switching.

Thus, when the cue signal of short duration is recorded on a magnetic tape at different tape speeds, the length of the cue signal recorded on the tape is shorter at a low tape speed than at a high tape speed. Therefore, particularly in the case an information signal is recorded at different tape speeds and a cue signal is also recorded at the respective different tape speeds, the cue signal of shorter duration, that is, recorded at a low tape speed may not be detected and hence a desired portion of the information signal recorded may not be detected, upon the automatic search operation at which the cue signal is detected while transporting the magnetic tape at a high speed.

It is an object of this invention to provide a retrieval signal recording apparatus for adding a cue signal for search operation on an information signal recorded on the tape, so that there is a small influence on the reproduction of the information signal and that even if the tape is switched to any of different tape speeds, the cue signal ca be detected surely.

According to one aspect of this invention, there is provided a retrieval signal recording apparatus in which the recording time of the signal to be recorded for search operation is changed with the switching of tape speeds so that the length of the retrieval signal recorded on the tape is not changed much, or preferably is kept substantially constant even if the tape speed upon recording is changed.

Since the retrieval signal recording apparatus according to this invention is suitable for use in video signal recording/reproducing apparatus, the embodiments of this invention mentioned below are examples of magnetic tape recording/reproducing apparatus for video signals, but the invention is not limited thereto.

The present invention will be apparent from the following detailed description taken in conjunction with the accompanying drawings, in which:

FIG. 1 is a block diagram of a main part of one embodiment of a retrieval signal recording apparatus according to this invention;

FIGS. 2a to 2c are a waveform diagram to which reference is made in explaining the operation thereof;

FIGS. 3a and 3b show the recorded states of the magnetic tape to which reference is made in explaining the action of this invention;

FIG. 4 is a block diagram of a main part of another embodiment of this invention; and FIGS. 5a to 5c are a waveform diagram to which reference is made in explaining the operation of the circuit arrangement of FIG. 4.

FIG. 1 is a block diagram of a main part of one embodiment of a retrieval signal recording apparatus suitable for use in magnetic tape recording/reproducing apparatus for video signal. This embodiment shows the case in which a cue signal for retrieval is recorded on a magnetic tape by an erase head. When the erase head is used for recording the cue signal, no additional head is required, and thus the magnetic tape transport mechanism of the conventional recording/reproducing apparatus can be used without any change, that is, it is not necessary for the apparatus to become large-sized. Referring to FIG. 1, there are shown a magnetic erase head 1 which is normally used for erasing the whole width of the magnetic tape, and a bias signal generating circuit 2 the output of which is applied to the magnetic head 1 as an erase signal or to an audio signal recording circuit (not shown), as a recording bias signal. Shown at 3 is a cue signal generating circuit, which generates a cue signal having a frequency selected so as to have a small influence on the video and audio signals recorded on the magnetic tape. For example, the frequency may be selected to be 30 Hz for the NTSC-system video cassette recorder, and 25 Hz for the PAL-system one. Although the frequency of the cue signal is not necessary to be limited particularly to these values, the use of the values makes it possible to use either the vertical synchronizing signal of the video signal or the rotational position detecting signal from the rotating head unit without a particular oscillator for the signal generating circuit 3, resulting in the circuit arrangement being simple. Shown at 5 is a gate circuit for adding the output of this signal generating circuit 3 on the output of the bias signal generating circuit 2, and 4 designates a control circuit which is responsive to a signal from an operation means (not shown), to control each circuit of the magnetic tape recording/reproducing apparatus. In this embodiment, the control circuit 4 may be a control circuit which only produces a signal of, for example, "high" level upon recording and a signal of "low" level in the other operation modes, and thus a known control circuit can be used therefor. It is of course possible to use any control circuit which produces distinguishably different signals for the recording mode and the other operation modes, because for example even if the relationship between the "high" and "low" levels of a control circuit and the operation modes is reversed, the output of such a circuit can be used by simply inverting the levels. In this embodiment, it is assumed that in the recording mode the control circuit 4 produces "high" level signal at its output terminal R.

The output from the terminal R of the control circuit 4 is applied to a gate control circuit, thereby controlling the gate circuit 5. When the gate circuit 5 is controlled to open, the cue signal from the signal generating circuit 3 is passed therethrough and added on the bias signal from the bias signal generating circuit 2. This added signal is applied to the magnetic head 1. The gate control circuit can be formed of for example, a monostable multivibration with variable time constant. This monostable multivibrator is formed of an AND circuit 13, an invertor 14, a resistor 7, capacitors 8 and 9 and a transistor 10. The time constant of the monostable multivibrator can be changed by connecting and disconnecting the capacitor 9 to the time constant circuit. This connecting and disconnecting operation is made by turning on and off the switching transistor 10. In other words, if the transistor 10 is turned on, the capacitance value for determining the time constant is the sum of the capacitances of the capacitors 8 and 9 and thus a large value. If the transistor 10 is turned off, the capacitance value for determining the time constant is only the capacitance of the capacitor 8 and hence a small value.

In the mode other than the recording mode, the control circuit 4 produces "low" level signal at its output terminal R and thus the potential at one input, or at point A, to the AND circuit 13 is "low" level. At this time, since the output of the inverter 14 is "high" level, the capacitor 8 is charged through the resistor 7, thus making the potential of the other input, or point B to the AND circuit 13 be "high" level. Consequently, since the one input and the other input to the AND circuit 13 are "low" and "high" levels, respectively, the output of the AND circuit 13 becomes "low" level. This follows that the gate circuit 5 is closed to prevent the cue signal from being applied to the magnetic head 1. When the control circuit 4 is switched to the recording mode, the output at the terminal R becomes "high" level, making the one input to the AND circuit 13 be immediately "high" level as shown in FIG. 2a (at time $t_1$). Since the output of the inverter 14 becomes "low" level, the potential of the capacitor 8 is gradually reduces to "low" level as a result of discharge through the resistor 7 as shown in FIG. 2b. Therefore, since the two inputs to the AND circuit 13 are both "high" level until the potential of the capacitor 8 is reduced to less than the threshold level of the AND circuit 13, the output of the AND circuit 13 becomes "high" level for time t depending on the time constant of the resistor 7 and capacitor 8 as shown in FIG. 2c. As a result, the gate circuit 5 is opened to allow the cue signal to be applied therethrough to the magnetic head 1 for time t.

If a switch 12 is turned on when the magnetic tape is switched to a low tape speed, i.e., if the switch 12 which operates in association with the operation of tape speed switching means not shown is provided and is closed when the tape speed is low, a bias voltage is applied through a resistor 11 to the base of the transistor 10. Therefore, the transistor 10 is turned on to connect the capacitor 9 in parallel with the capacitor 8. Consequently, when the control circuit 4 is made in the recording mode, the potential of the other input to the AND circuit 13 is more gradually decreased as shown in FIG. 2b by two-dot chain line because the discharge time constant is increased by the addition of the capacitance of the capacitor 9 to the capacitor 8. This follows that the "high" level output of the AND circuit 13 continues for a longer time as shown in FIG. 2c by two-dot chain line, enabling the cue signal to be recorded for a longer time. As a result, the length of the cue signal recorded on the magnetic tape can be constant whichever the tape speed is low or high. The extension of time can of course be adjusted by the value of the capacitance of the capacitor 9.

When the output of the control circuit 4 becomes "low" level after the end of the recording mode (time $t_2$), the one input to the AND circuit 13 immediately becomes "low" level as shown in FIG. 2a, and thus the output of the AND circuit 13 is not changed, or stays at "low" level as shown in FIG. 2c. Therefore, at the beginning of the recording mode, the cue signal is recorded for a certain time depending on the switched tape speed, to be added on the information signal, as shown in FIGS. 3a and 3b. FIG. 3a shows a recorded state of the magnetic tape in which the cue signal is recorded for a constant time irrespective of change of tape speed. In FIG. 3a, the left hand side shows the case of high tape-speed and the right hand side shows the case of low tape-speed. When a cue signal 102a is recorded at high tape speed to be added on the beginning of an information-recorded portion 101, the length of the added portion becomes $l_1$. When a cue signal 102b is similarly recorded at low tape-speed to be added on the beginning of an information-recorded portion 101', the length of the added portion is $l_2$ shorter than $l_1$ as illustrated unless the recording time of the cue signal is changed. For example, in the VHS system video cassette recorder wherein a cue signal of a constant time is recorded both at the standard tape speed and ⅓ the standard speed, the length $l_2$ becomes ⅓ the length $l_1$. In FIGS. 3a and 3b, numeral 103 designates non-recorded portions. On the other hand, according to this embodiment, since the recording time of the cue signal can be extended when the tape speed is low, the length $l_1$ of the cue signal recorded portion 102a at high tape speed can be made substantially equal to the length $l_1'$ of the cue signal recorded portion 102c at low tape speed as shown in FIG. 3b. Therefore, when the tape is travelled at high speed in search mode, even the cue signal recorded at low tape speed can be surely detected.

FIG. 4 is a block diagram of another embodiment of this invention. In this embodiment, the cue signal for retrieval is recorded at both the beginning and the end of the information-signal recorded portion, differing from the previous embodiment in which the cue signal is recorded only at the beginning of that portion. The advantage in recording the cue signal at the end of the information recorded portion is that when an information signal is recorded later on the non-recorded portion of the magnetic tape which was partially recorded, the beginning of the non-recorded portion can be rapidly detected easily by search operation by detecting the cue signal at the end of the previously recorded information signal.

This embodiment is different from the previous embodiment in the gate control circuit formed of a monostable multivibrator. That is, at the end of the recording mode, a signal is also generated to open the gate circuit 5. Specifically, for example, the inverter 14 in FIG. 1 is removed, and instead of the AND circuit 13 an exclusive OR (hereinafter, abbreviated EXOR) circuit 16 is provided.

In FIG. 4, when the control circuit 4 produces at output terminal R, a "high" level at the start of recording (time $t_1$), the potential of the one input, point A to the EXOR circuit 16 immediately becomes "high" as shown in FIG. 5a. The potential at the other input point B to the EXOR circuit 16 gradually increases with the time constant determined by the values of the resistance of the resistor 7 and capacitance of the capacitor 8 as shown in FIG. 5b because it charges the capacitor 8 through the resistor 7. Therefore, since the two inputs to the EXOR circuit 16 are respectively "high" level and "low" level until the potential at point B reaches a high threshold level Eth, the output of the EXOR circuit 16 becomes "high" level as shown in FIG. 5c. Since the two inputs become both "high" level when the other input potential becomes higher than the high threshold level Eth, the output of the EXOR circuit 16 becomes "low" level. When the control circuit 4 produces "low" level output at the end of recording (time $t_2$), the potential at point A immediately becomes "low" level as shown in FIG. 5a, and the potential at point B gradually decreases to "low" level because the charge of the capacitor 8 discharges through the resistor 7. Consequently, the EXOR circuit 16 produces "high" level output and the "high" level output is kept until the potential at point B becomes lower than the how threshold level Etl. Thus, the high-level signals to open the gate circuit 5 are generated from the EXOR circuit 16 to enable the cue signal for retrieval to be recorded at both the beginning and end of the recording mode as shown in FIG. 5c.

Also, if the switch 12 which is operated in association with the switching of tape speeds is operated in the low tape-speed mode to turn on the switching transistor 10, adding the capacitor 9 to increase the time constant, then such operation as indicated by FIGS. 5b and 5c by two-dot chain line is carried out, preventing the length of the recorded cue signal for retrieval from decreasing when the tape speed is low, as in the previous embodiment.

While two time constants are switched upon the switching of tape speeds as mentioned previously, it is possible to provide three or more time constants to be switched upon the switching of three or more different tape speeds and thus this invention can be used in the magnetic tape recording/reproducing apparatus capable of two or more different tape speeds to be switched.

There is, for example a VHS system video cassette recorder capable of three different tape speeds, i.e., standard, ½ standard and ⅓ standard speeds, two-fold and three-fold recording time. If this invention is applied to this apparatus, and if the recording time of the cue signal is selected to be for example, about 1.5 sec for standard tape speed mode, thus 3 sec for ½ standard mode and 4.5 sec for ⅓ standard mode, the length of the recorded cue signal for any of the three tape speeds can be made constant. In practice, even if it is not strictly constant, for example, even by the recording time of 2.3 sec for ½ standard speed and 3.0 sec for ⅓ standard speed, the recorded cue signal can be detected at high tape speed without trouble.

While a magnetic head used to record the cue signal is preferable to the magnetic head 1 which erases the entire width of the magnetic tape as described previously, a special magnetic head to be made in contact with the entire or a part of the width of the magnetic tape can be provided for recording the cue signal.

In the above embodiments, the constants of the time constant circuits are selected so that the length of recorded cue signal has an appropriate value for each recording tape speed and search tape speed.

I claim:

1. A retrieval signal recording apparatus for magnetic tape recording/reproducing apparatus capable of switching a plurality of different tape speeds, comprising:
   means for generating a retrieval signal and recording it on a magnetic tape; and
   means for controlling said recording means at least at the beginning of recording an information signal on said magnetic tape to change to recording time of said retrieval signal in response to the switching of the tape speeds so that the length of the retrieval signal recorded on the magnetic tape is substantially constant even if a different tape speed is selected, said means for controlling recording means including gate means for allowing said retrieval signal to pass therethrough, and means for generating a gate control signal the duration of which is changed in association with the tape speed switching means of the magnetic tape recording/reproducing apparatus and which is used to open said gate means, in response to a signal for making the magnetic tape recording/reproducing apparatus in the mode of recording the information signal.

2. A retrieval signal recording apparatus according to claim 1, wherein said recording means for retrieval signal has a magnetic head for erasing the substantially entire width of the magnetic tape, to which head a controlled retrieval signal is applied to be added on a bias signal.

3. A retrieval signal recording apparatus according to claim 1, wherein said recording means for retrieval signal has a magnetic head to which the controlled retrieval signal is applied to be added on a bias signal.

4. A retrieval signal recording apparatus according to claim 1, wherein said gate control signal generating means includes a monostable multivibrator having time constant circuits in which the capacitance values are switched in association with the switching of the tape speeds.

5. A retrieval signal recording apparatus according to claim 4, wherein said recording means for retrieval signal has a magnetic head to which the controlled retrieval signal is applied to be added on bias signal.

6. A retrieval signal recording apparatus according to claim 4, wherein said recording means for retrieval signal has a magnetic head for erasing the substantially entire width of the magnetic tape, to which head a controlled retrieval signal is applied to be added on a bias signal.

7. A retrieval signal recording apparatus according to claim 1, wherein said gate control signal generating means includes a monostable multivibrator capable of switching time constant circuits.

8. A retrieval signal recording apparatus according to claim 7 wherein said recording means for retrieval signal has a magnetic head to which the controlled retrieval signal is applied to be added on a bias signal.

9. A retrieval signal recording apparatus according to claim 7, wherein said recording means for retrieval signal has a magnetic head for erasing the substantially entire width of the magnetic tape, to which head a controlled retrieval signal is applied to be added on a bias signal.

10. A retrieval signal recording apparatus for magnetic tape recording/reproducing apparatus capable of switching a plurality of different tape speeds, comprising:

means for generating a retrieval signal and recording it on a magnetic tape; and means for controlling said recording means at lest at the beginning of recording an information signal on said magnetic tape to change the recording time of said retrieval signal in response to the switching of the tape speeds so that the length of the retrieval signal recorded on the magnetic tape is substantially constant even if a different tape speed is selected, said means for controlling said recording means including gate means for allowing said retrieval signal to pass therethrough, and means for generating a gate control signal the duration of which is changed in association with the tape speed switching means of the magnetic tape recording/reproducing apparatus and which is used to open said gate means, in response to a signal for making the magnetic tape recording/reproducing apparatus in the mode of recording the information signal at the beginning of recording and at the end of the recording mode.

11. A retrieval signal recording apparatus according to claim 10, wherein said recording means for retrieval signal has a magnetic head for erasing the substantially entire width of the magnetic tape, to which head a controlled retrieval signal is applied to be added on a bias signal.

12. A retrieval signal recording apparatus according to claim 10, wherein said recording means for retrieval signal has a magnetic head to which the controlled retrieval signal is applied to be added on a bias signal.

13. A retrieval signal recording apparatus according to claim 10, wherein said gate control signal generating means includes:

an exclusive logic sum circuit having one input terminal to which the signal for making the magnetic tape recording/ reproducing apparatus in the recording mode is applied directly, and the other input terminal to which said signal is applied through a time constant circuit the time constant of which can be switched.

14. A retrieval signal recording apparatus according to claim 13, wherein said recording means for retrieval signal has a magnetic head for erasing the substantially entire width of the magnetic tape, to which head a controlled retrieval signal is applied to be added on a bias signal.

15. A retrieval signal recording apparatus according to claim 13, wherein said recording means for retrieval signal has a magnetic head to which the controlled retrieval signal is applied to be added on a bias signal.

16. A retrieval signal recording apparatus according to claim 13, wherein said time constant circuit includes capacitor means the capacitance value of which is changeable in association with the switching of the tape speeds of the magnetic tape recording/reproducing apparatus, and a resistor.

17. A retrieval signal recording apparatus according to claim 16, wherein said recording means for retrieval signal has a magnetic head to which the controlled retrieval signal is applied to be added on a bias signal.

18. A retrieval signal recording apparatus according to claim 16, wherein said recording means for retrieval signal has a magnetic head for erasing the substantially entire width of the magnetic tape, to which head a controlled retrieval signal is applied to be added on a bias signal.

* * * * *